United States Patent [19]

Cox et al.

[11] Patent Number: 5,159,455

[45] Date of Patent: Oct. 27, 1992

[54] MULTISENSOR HIGH-RESOLUTION CAMERA

[75] Inventors: John D. Cox; David E. Fowler, both of Gainesville, Fla.

[73] Assignee: General Imaging Corporation, Gainesville, Fla.

[21] Appl. No.: 488,957

[22] Filed: Mar. 5, 1990

[51] Int. Cl.[5] ............... H04N 3/14; H04N 5/335; H04N 5/30

[52] U.S. Cl. ............... 358/213.11; 358/225; 358/209; 358/901; 250/208.1

[58] Field of Search ............... 358/209, 213.11, 901, 358/225, 212, 55, 41, 50, 133, 87, 166, 109, 204, 101, 51; 357/24 LR, 40, 45; 250/208.1

[56] References Cited

U.S. PATENT DOCUMENTS

| | | | |
|---|---|---|---|
| 4,323,925 | 4/1982 | Abell et al. | 358/225 |
| 4,797,942 | 1/1989 | Burt | 382/41 |
| 4,837,628 | 6/1989 | Sasaki | 358/209 |
| 4,914,513 | 4/1990 | Spigarelli et al. | 358/101 |

Primary Examiner—James J. Groody
Assistant Examiner—Safet Metjahic
Attorney, Agent, or Firm—Foley & Lardner

[57] ABSTRACT

A multisensor high-resolution camera splices together sub-images obtained from a plurality of fiber bundles and can play back these sub-images as a single composite image in real time. The camera can output the composite image as a single high-resolution analog video image or as a stream of digital data. The camera produces these composite images from the optical sub-images output by tapered or nontapered fiber bundles. A scan converter splices together video signals output from the plurality of video cameras or the multiport video camera/cameras each of which is optically coupled to one of the plurality of fiber bundles. The sensor arrays can also be driven directly. In this case each sensor array is coupled to one of the fiber bundles. The sensor arrays are either multiple single port integrated circuit (IC) sensor arrays such as CCD arrays or multiport (IC) arrays.

38 Claims, 19 Drawing Sheets

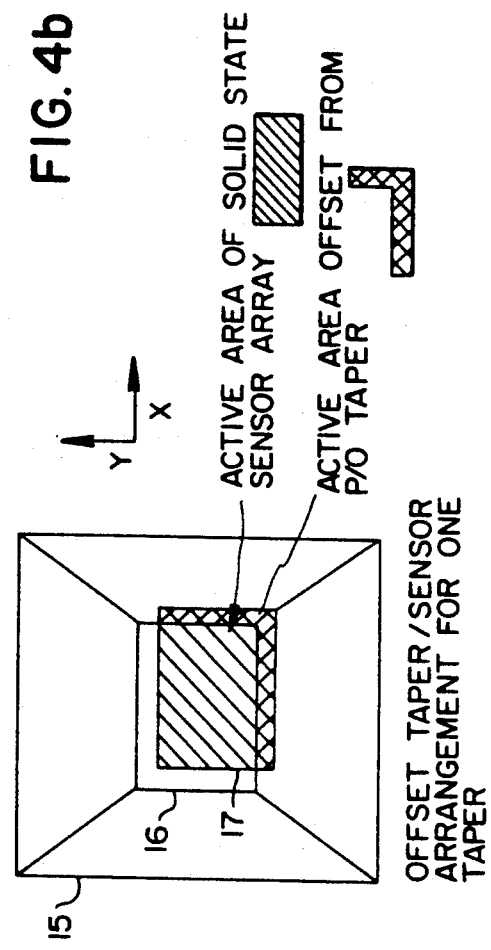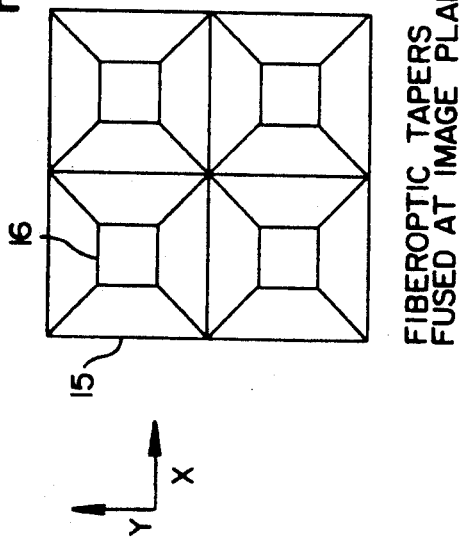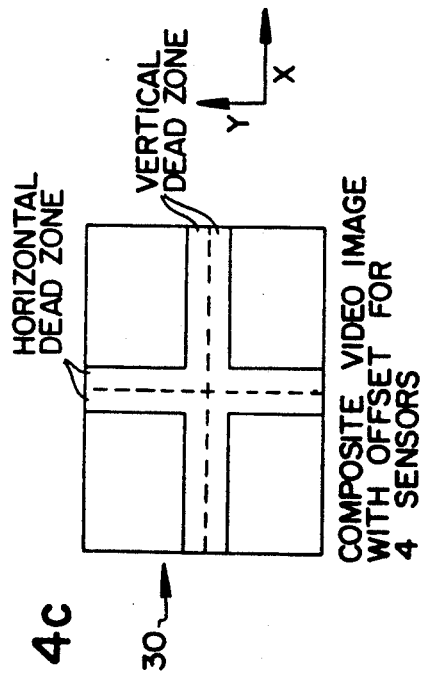

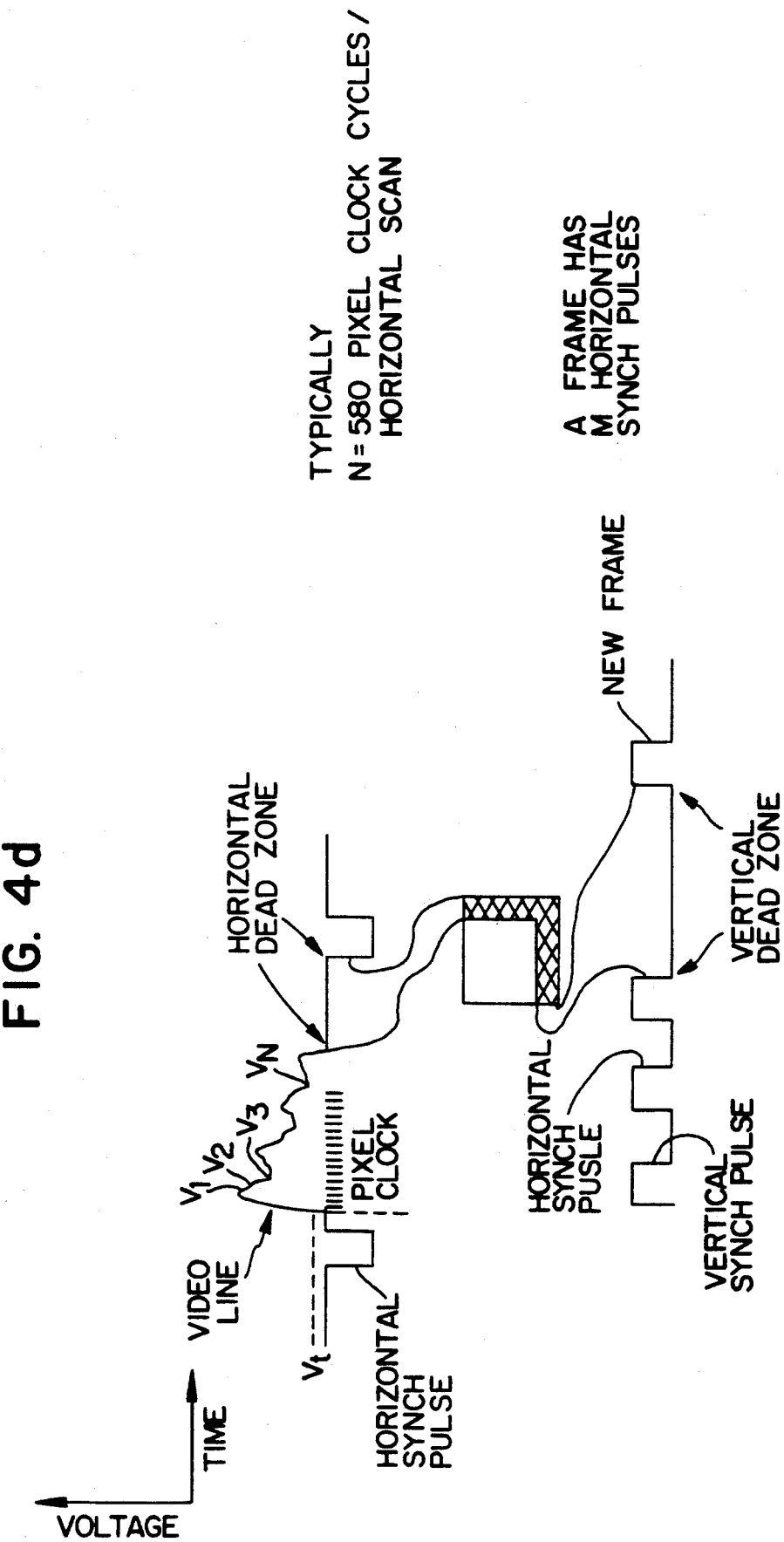

PRIMARY X-RAY

SCATTERED LIGHT RAYS FROM SCINTILLATING CRYSTALS

CONVENTIONAL DEPOSITED SALT SCREEN

PRIMARY X-RAY

SCATTERED LIGHT RAYS

FIBER/OPTIC SCINTILLATION SCREEN

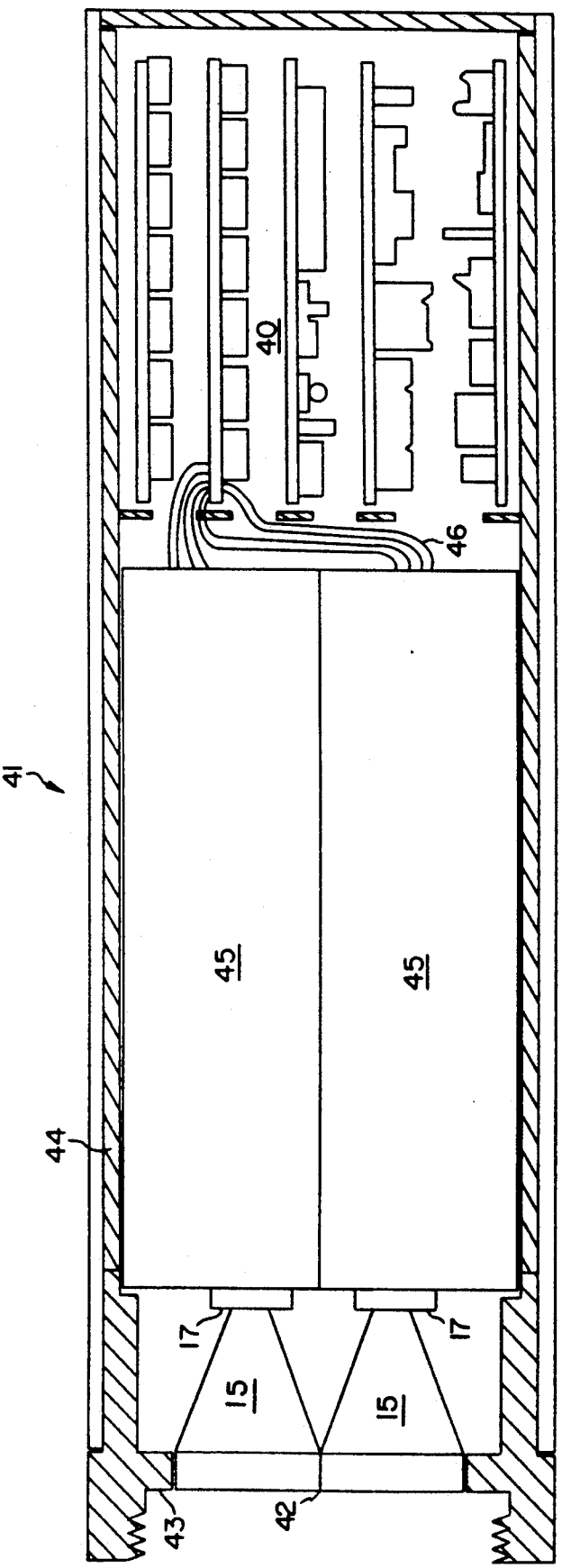

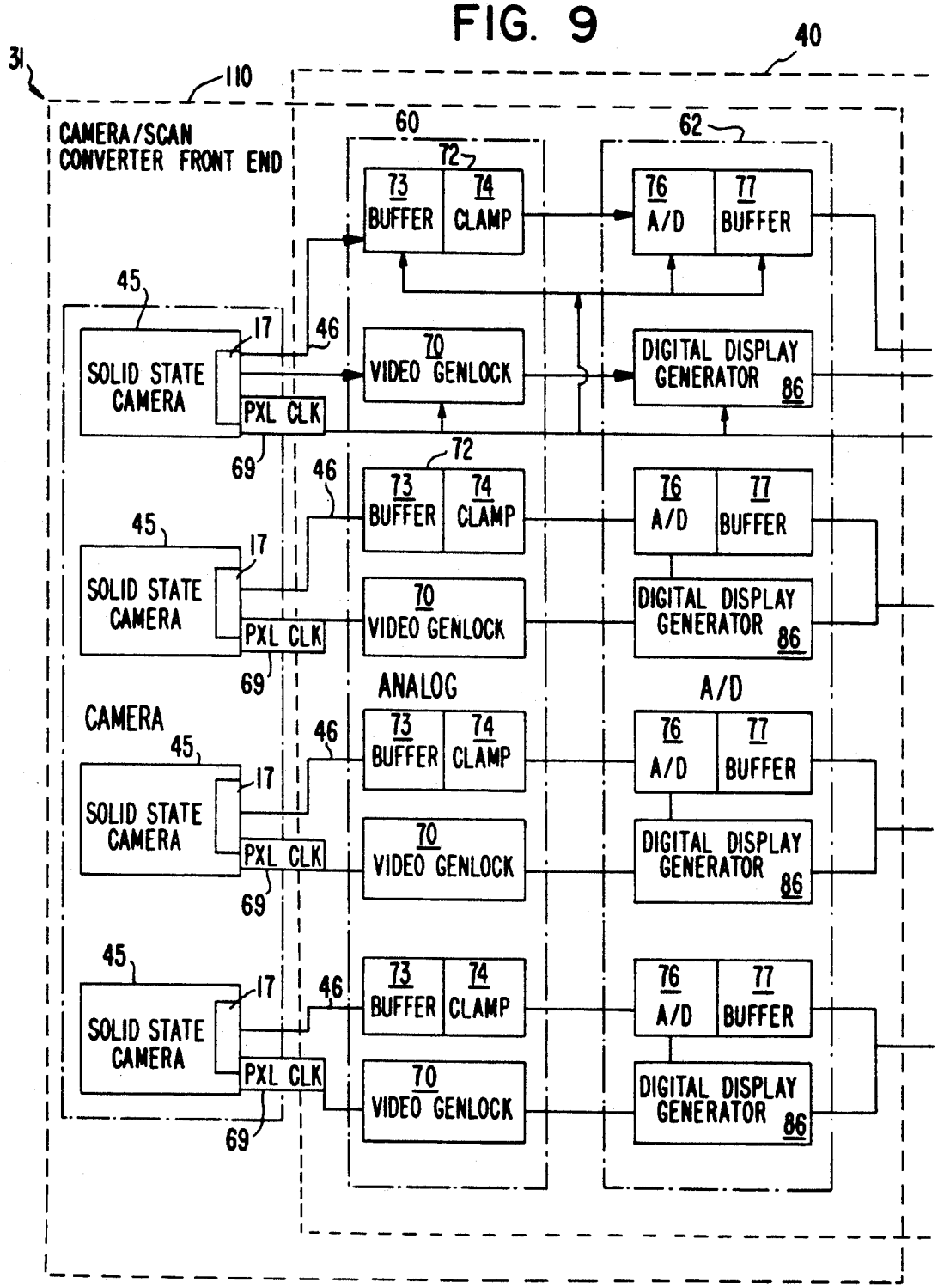

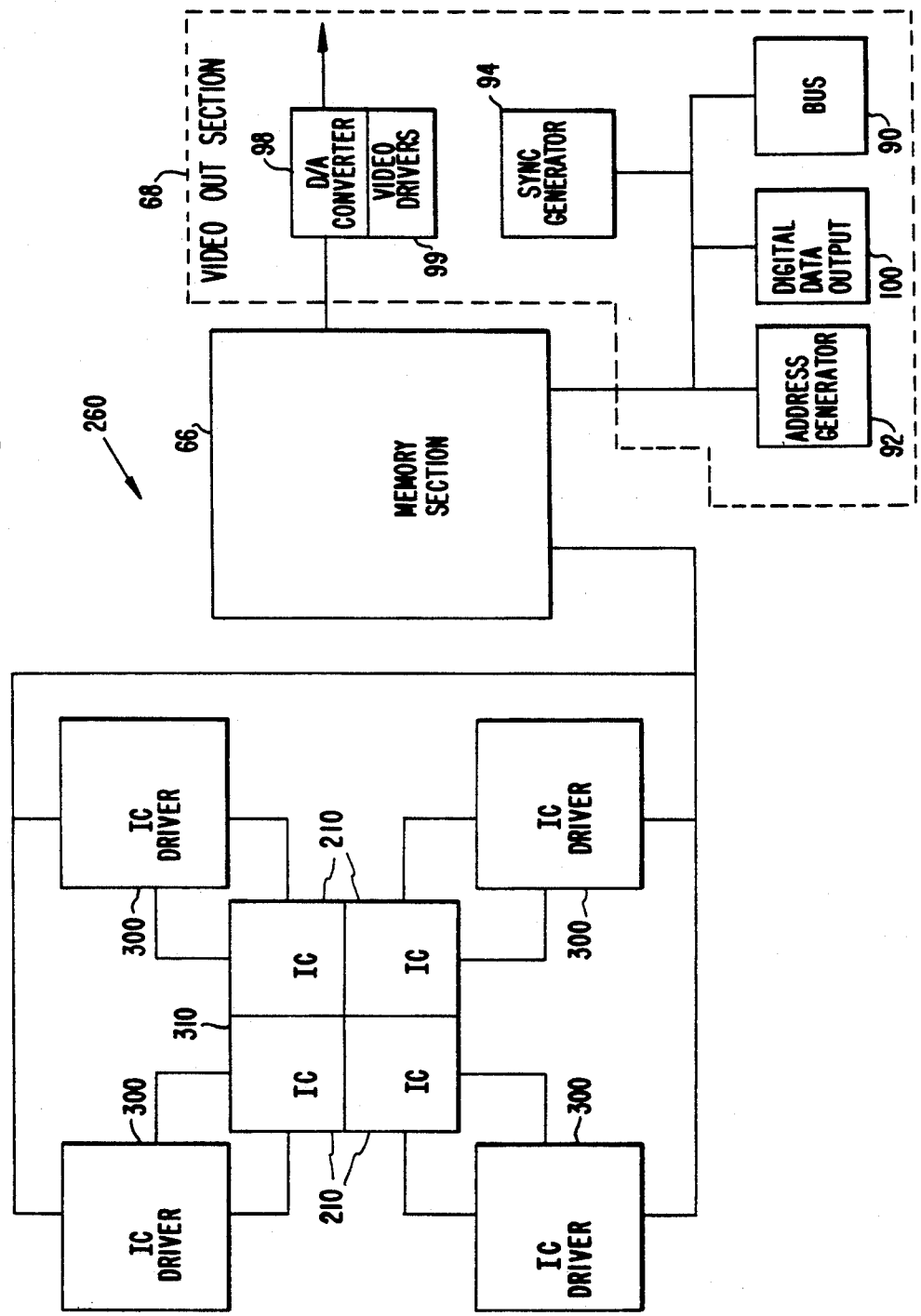

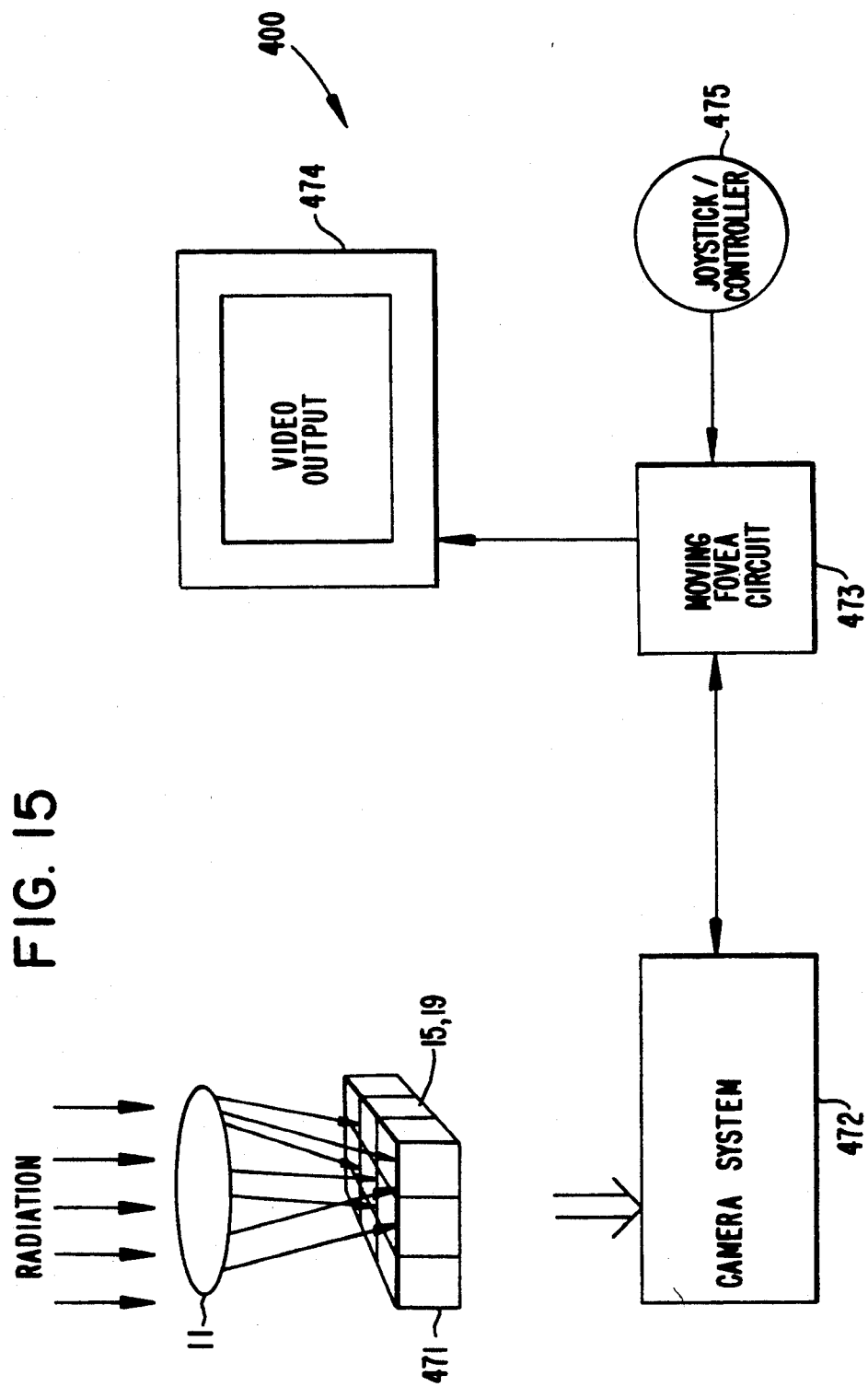

MULTISENSOR HIGH-RESOLUTION CAMERA

BACKGROUND OF THE INVENTION

The invention relates generally to solid-state sensor arrays, and particularly to a camera which can acquire high resolution video in real time.

Conventional solid-state video cameras utilizing a very large number of pixels, e.g., over one million, are currently unable to operate at real time frame rates, on the order of 30 frames per second. This deficiency is due to the limitations on the clock speed at which solid-state video sensors having a very large number of pixels can be used. Consequently, even though large high resolution sensors are available, the pixels of these sensors cannot be read out in real time at conventional frame rates.

SUMMARY OF THE INVENTION

An object of the invention is to provide an apparatus capable of producing an arbitrarily large number of video pixels without reducing the frame rate at which the apparatus can be operated. This objective is achieved by running multiple relatively small sensor arrays in parallel, thus providing a large number of pixels per video frame. These pixels are grouped into individual segments corresponding to the field of view of each of the small sensor arrays. Accordingly, each segment needs to be spliced together to form a contiguous ultra-high-resolution image. This splicing needs to take place at both the front and the rear end of the system.

The front end splice can be accomplished using coherent fiber-optic bundles that are cemented or fused together on one end, thus creating the focal plane of the camera and are coupled at the other end to the individual solid-state sensor arrays.

The rear end splice can be achieved by either running multiple video cameras with small sensor arrays in parallel and sorting the outputs of the video cameras using a scan converter, or by running multiple sensor driver/digitizers, which either individually drive a single sensor array integrated circuit (IC) or together drive a multiport sensor array IC.

Multiple video cameras outputs must be spliced together to create a single ultra-high-resolution video signal such as an RS-343 (1K×1K) real-time video signal. In this case, a scan converter must be used which takes the incoming parallel video signals, digitizes them and feeds a memory array or buffer. This memory array can be read out in a high speed serial sequence while it is being fed by the incoming video. The digital data is then converted back to analog. Video sync signals are then added to the analog signal thus creating an RS-343 video signal.

A single multiport video camera can be used instead of multiple video cameras. Again, a scan converter must be used which takes the incoming parallel video signals, digitizes them and feeds a memory array or buffer.

Multiple individual CCD arrays can be run in parallel using an IC/driver/digitizer. The IC/driver/digitizer provides timing and power directly to a CCD IC. The output of the CCD IC is analog to digital (A/D) converted and fed into a memory array or buffer as was the case using multiple video camera outputs. However, in this case an automatic gain control (AGC) summer and an AGC multiplier must be included in order to establish a reference voltage before the digital signals are stored in memory. Again, the memory array can be read out in a high speed serial sequence while it is being fed by the incoming (parallel) video. The data is then converted back to analog. Video sync signals are then added to the analog signals creating an RS-343 video signal.

Multiport CCD IC's can be driven using multiple CCD/IC/driver/digitizers.

This concept can be expanded to any number of cameras or CCD IC driver/digitizers.

BRIEF DESCRIPTION OF THE DRAWINGS

FIGS. 4a–4d illustrate an alignment process; 4a illustrates a rear view of the tapered fiber-optic bundles, 4b illustrates an approach to aligning the bundle sub-image with the image sensor module, 4c illustrates the resulting composite video image, and 4d shows a video signal corresponding to one quadrant of the composite video image;

FIG. 8 is a diagramatic representation, in cross section, of the present invention embodied as a multiple camera device;

FIG. 14 is a block diagram demonstrating how the IC driver 300 can drive a multiport IC sensor;

FIG. 15 is a block diagram illustrating how the camera/scan converter or the multi-IC device can be used with standard imaging equipment and a fovea circuit.

DETAILED DESCRIPTION OF THE PREFERRED EMBODIMENTS

Figure 1:
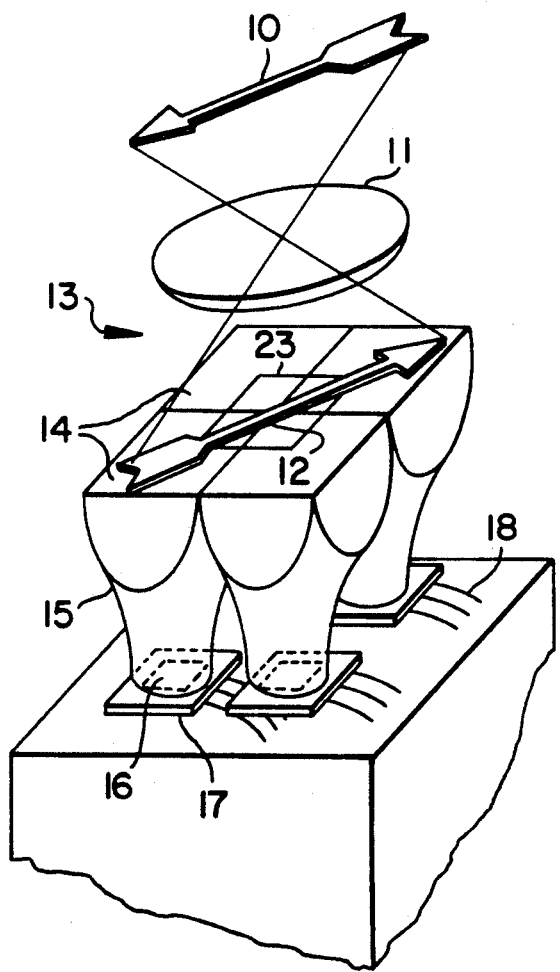
FIG. 1 illustrates tapered fiber-optic bundles as used in accordance with the present invention.

Referring now to FIG. 1, a set of four tapered fiber-optic bundles 15 comprises a front end splice of the apparatus which is used to splice images together to create a seamless ultra-high resolution image. Such an array of tapered fiber-optic bundles is disclosed in U.S. Pat. No. 4,323,925 issued to Abell et al, and incorporated herein by reference. An object 10 is projected by a lens 11 to form an optical image 12 onto an image surface 13. The optical image 12 is subdivided into optical sub-images 14 upon the image surface 13. A portion of the image-bearing energy of each optical sub-image 14 passes through the image surface 13 as a sub-image-bearing flux which is transmitted in image-coherent geometrically reduced form by tapered fiber-optic bundles 15 which acts as a minifying means, and yield minified image-coherent geometrically reduced images or bundle sub-images 16.

The larger ends of the tapered fiber-optic bundles 15 are cut down to form contiguous surfaces associated with the optical sub-images 14 and together define the entire image surface 13. A portion of the light energy from each optical sub-image 14 is transmitted through the image surface 13 in image-coherent form to emerge in geometrically reduced or minified form through the bundle sub-image 16 at a smaller end of the tapered fiber-optic bundle 15. Each bundle sub-image 16 is directed to an image sensor module 17, which may typically be a solid-state discrete element electro-optical scanner of the CCD, CID or MOS type, but may also be a conventional television camera tube. Electrical leads 18 associated with each image sensor module 17 pass the image electrical signals to the remainder of the circuitry disclosed herein.

Figure 2:
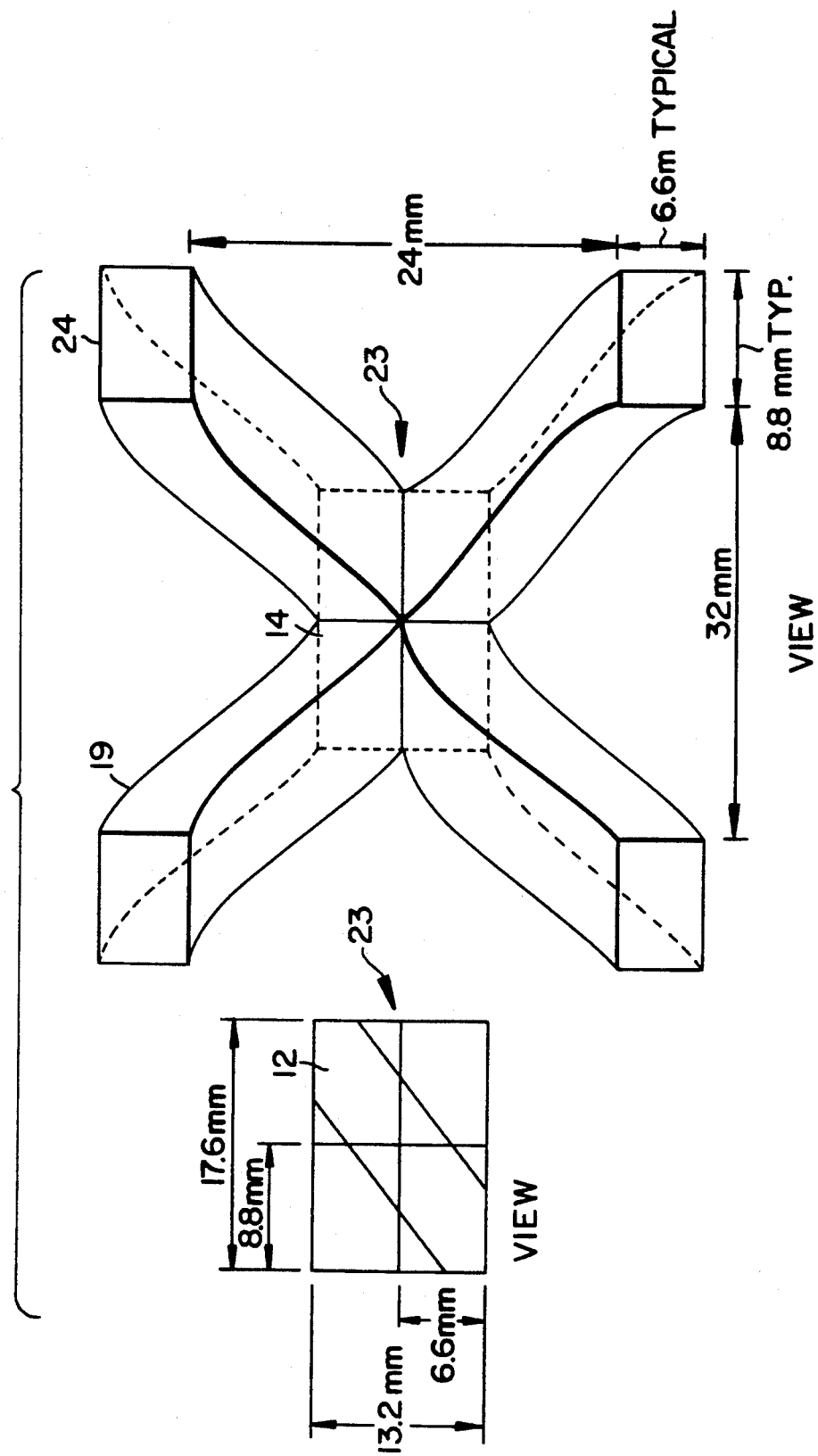
FIG. 2 illustrates untapered fiber-optic bundles as used in accordance with the present invention.

FIG. 2 illustrates the front end splice using non-tapered fiber-optic bundles 19 resulting in a reduced image surface 23 and a reduced optical sub-image 24. In this case, the reduced image surface 23 subtends only a portion of the optical image 12 and the reduced optical sub-image 24 has the same dimensions as the bundle sub-image 16, typically on the order of 8.8 mm×6.6 mm. For a given lens 11 the object 10 will project the image 12 on the image surface 23 as shown in FIG. 2. If the bundle sub-image 16 and the reduced optic sub-image 24 have the same active area and the image sensor module 17 is unchanged then the non-tapered bundle 19 provides more resolution than the tapered bundle 15, with a corresponding reduction in field-of-view (FOV). Hence, non-tapered bundles are preferred for higher resolution smaller FOV situations, whereas tapered fiber-optic bundles are preferred for lower resolution larger FOV situations. It should be noted that tapered bundles are currently more expensive to produce so that non-tapered bundles may also be preferable from this perspective.

Figure 3:
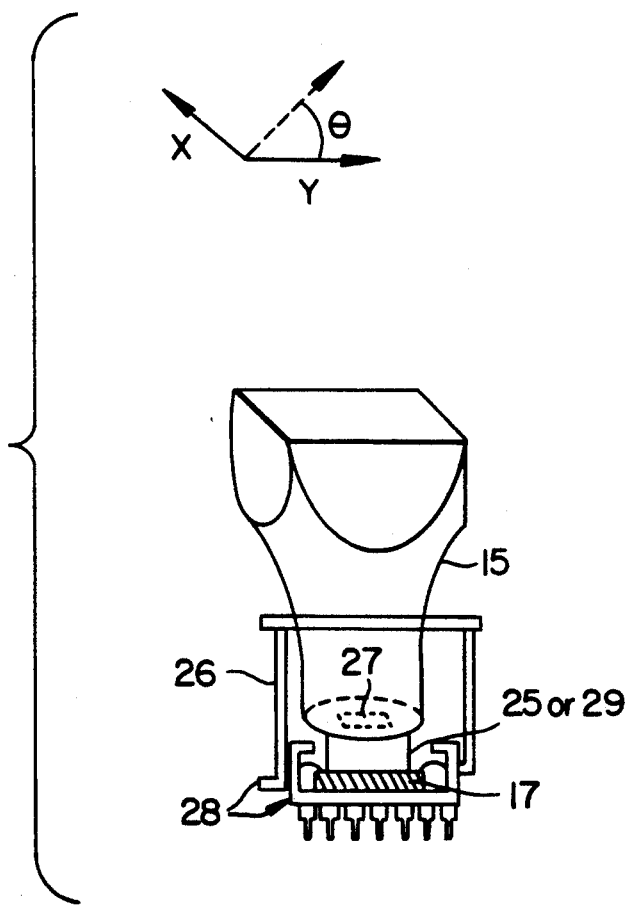
FIG. 3 illustrates mounting the tapered or untapered fiber-optic bundles for micrometer adjustment of X, Y and $\Theta$.

FIG. 3 demonstrates one method which can be used to align the tapered fiber-optic bundle 15 with the image sensor module 17. The tapered fiber-optic bundle 15 is butted-up against a fiber-optic stud 25 which is mounted directly on the image sensor module 17. A clamping tool 26 is used to hold the fiber-optic stud 25 against the tapered fiber-optic bundle 15. A drop of optical grease 27 is used to provide a high viscosity transparent butted finish between the tapered fiber-optic bundle 15 and the fiber-optic stud 25. A micrometer adjustment 28 is used to adjust the relative positions of the tapered fiber-optic bundle 15 and the fiber-optic stud 25. The micrometer adjustment 28 adjusts the X, Y and Θ positions of the fiber-optic stud 25 in such a way that individual fibers in the fiber-optic bundle 15 are aligned with individual fibers in the fiber-optic stud 25.

Another technique for alignment involves butting the tapered fiber-optic bundle 15 directly against the image sensor module 17 using UV curing optical cement. The UV curing optical cement 29 can be cured by shining UV light directly through the tapered fiber-optic bundle 15 after alignment is complete. In this case, the fiber-optic stud 25 is not used. However, the clamping tool 26 and micrometer adjustment 28 are still used for alignment. Typical diameters of the optical cores of the individual fibers at the bundle sub-image 16 are on the order of 6 micrometers, and individual pixels on the image sensor module 17 are on the order of 10 micrometers. In order to avoid aliasing, it is desirable to have multiple fibers for every sensor pixel on the image sensor module 17. As in the early adjustment procedure, the micrometer adjustment 28 is used to adjust the image sensor module 17 in the X, Y and Θ directions. This can be done by observing an actual video output on a screen as will now be described.

FIGS. 4a–4d demonstrate one method of aligning the bundle sub-image 16 with the image sensor module 17. FIG. 4a is a rear view of the tapered fiber-optic bundle 15. FIG. 4b shows the image sensor module 17 offset from and or is larger than the bundle sub-image 16. The image sensor module 17 and the bundle sub-image 16 need not be the same size. In fact, it is desirable for alignment purposes to have the sensor module 17 slightly larger than the bundle sub-image 16 so that some pixels of the sensor module 16 do not detect the bundle sub-image. Then, using the rear end splice yet to be discussed, a composite video image 30 is produced at the output of the apparatus as shown in FIG. 4c. Note that horizontal and vertical deadzones result from misaligning and/or difference in sizes of the image sensor module 17 with the bundle sub-image 16. The composite image 30 is displayed as an actual video output on a screen and the micrometer adjustment 28 on FIG. 3 is used to adjust the location of the bundle sub-image 16 until the composite image 30 shows no spatial frequency interference between the cores of the fibers of the fiber-optic bundle 15 and the pixels of the image sensor module 17 and the horizontal and vertical deadzones appear as thin strips as shown in FIG. 4c. The number of pixels on the image sensor module 17 which correspond to the horizontal deadzones and the number of horizontal lines or scans corresponding to the vertical deadzones will be typically on the order of 6.

FIG. 4d shows the horizontal and vertical deadzones with respect to a video signal or video line and its corresponding horizontal sync pulse. This video line corresponds to the tapered fiber-optic bundle 15 on the top left corner of the composite image 30 on FIG. 4c. The horizontal sync pulse is followed by a video line for each horizontal scan. A pixel clock is shown below the video line. Typically, this pixel clock would have 512 cycles or counts for each horizontal scan. Note that the horizontal deadzone in FIG. 4c is represented by a fixed voltage on the video line in FIG. 4d, which is present for several pixel clock cycles. The vertical deadzone is represented by a fixed voltage in the video line, which is present for several horizontal sync pulses corresponding to many pixel clock cycles.

Figure 5B:
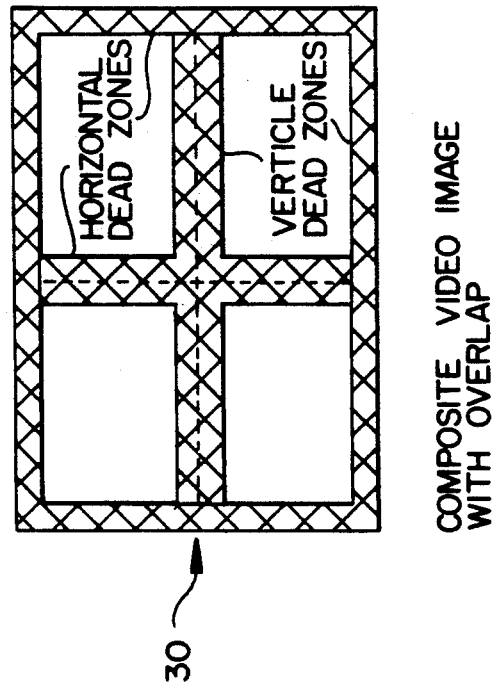
FIGS. 5a–5c illustrate an alternative alignment process; 5a illustrates an alternative approach to aligning the bundle sub-image with the image sensor module, 5b illustrates the resulting composite video image, and 5c shows a video signal corresponding to one quadrant of the composite video image.
Figure 5A:
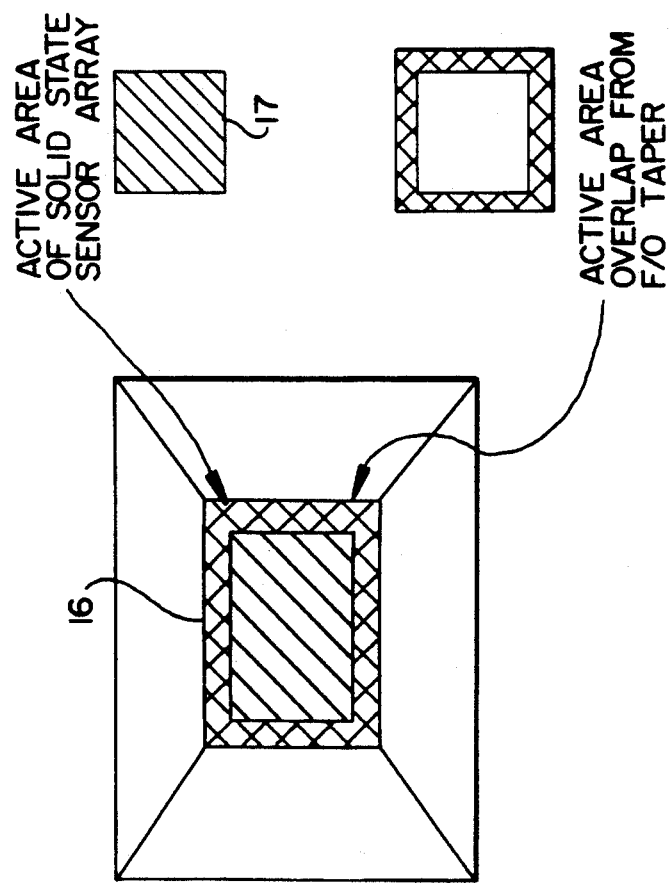
Figure 5C:
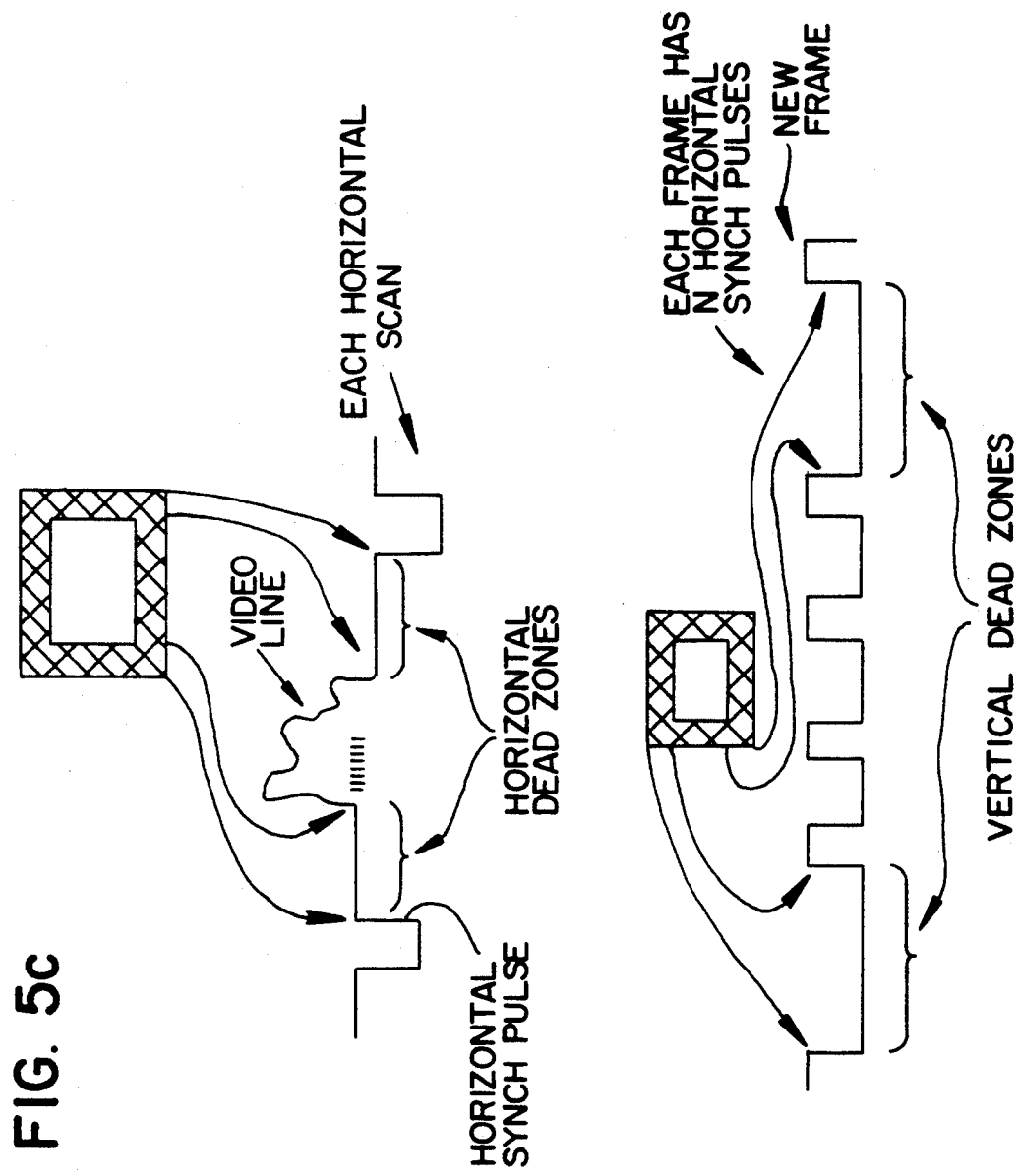

FIGS. 5a–5c show another approach to aligning the image sensor module 17 with the bundle sub-image 16. Here, the bundle sub-image 16 overlaps the image sensor module 17 on all four sides. FIG. 5b shows the corresponding composite video image 30 with its horizontal and vertical deadzones. FIG. 5c shows the corresponding video signal with its horizontal sync pulse and horizontal deadzones. The horizontal and vertical deadzones of FIGS. 4c and 5b are eliminated by delaying the onset of a memory address generating process as will be discussed in connection with the rear end splice.

Figure 6A:
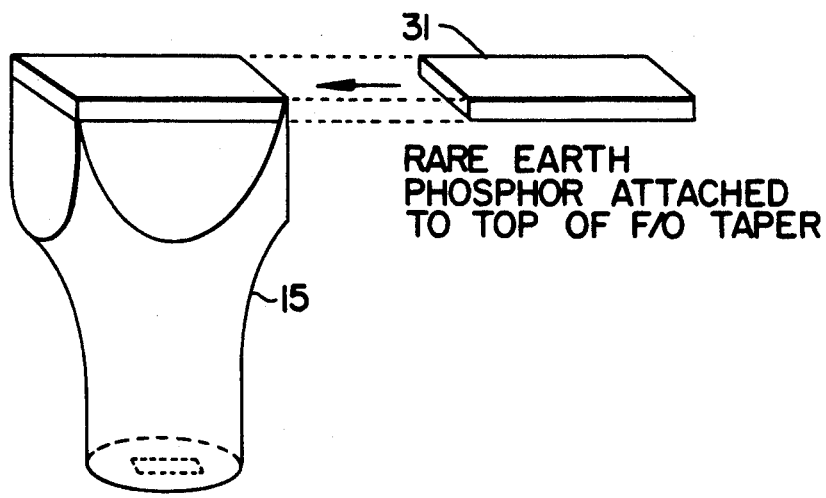
FIGS. 6a and 6b illustrate a fiber-optic bundle taper configured to include a phosphor sheet and a thin layer doped with rare earth salts, respectively, in order to form a scintillating screen.
Figure 6B:
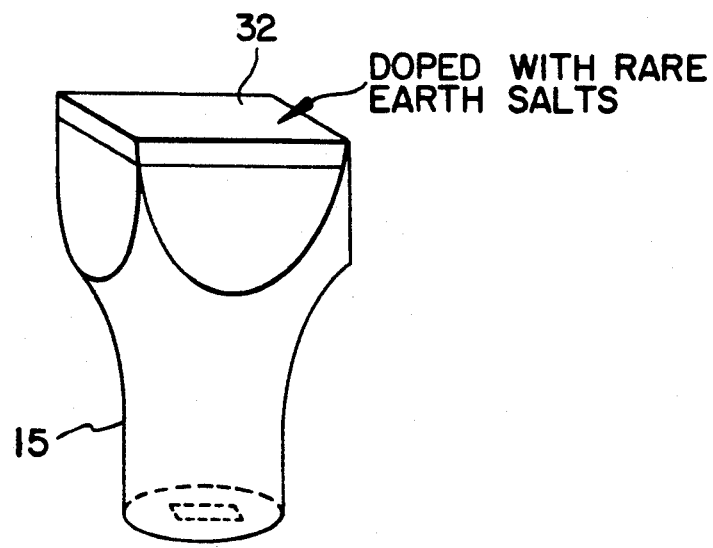
Figure 7A:
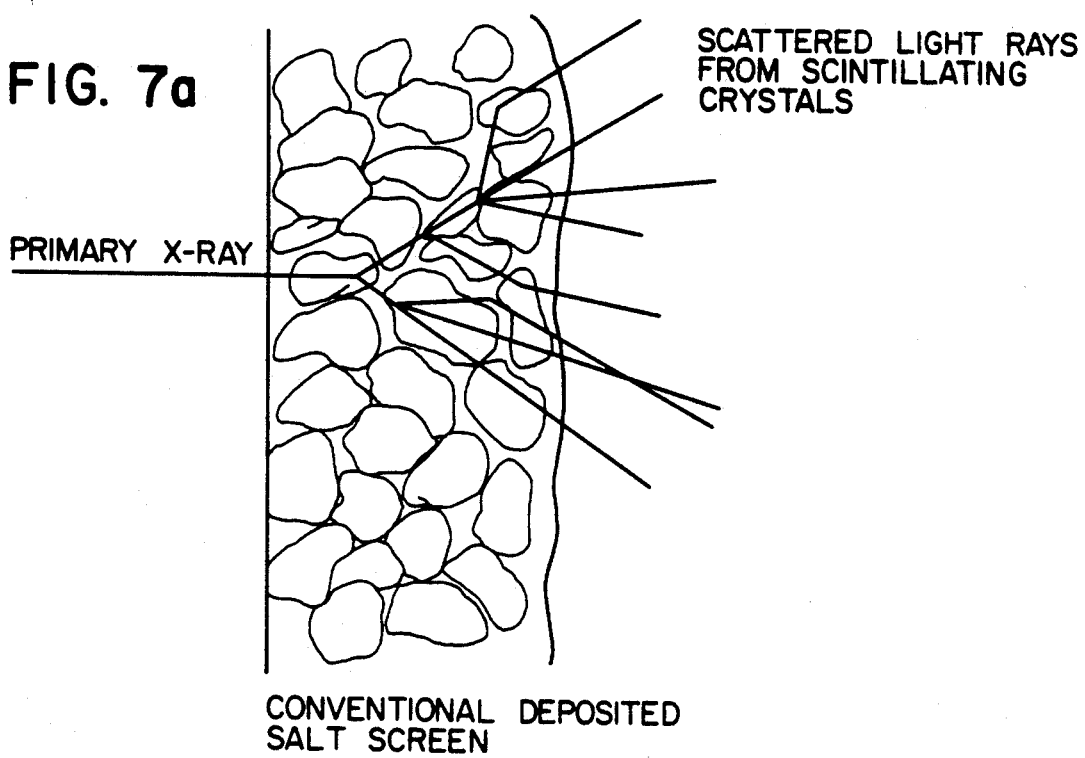
FIGS. 7a and 7b illustrate the scattering of light rays produced from x-ray radiation incident upon the scintillation screens as shown in FIGS. 6a and 6b.
Figure 7B:
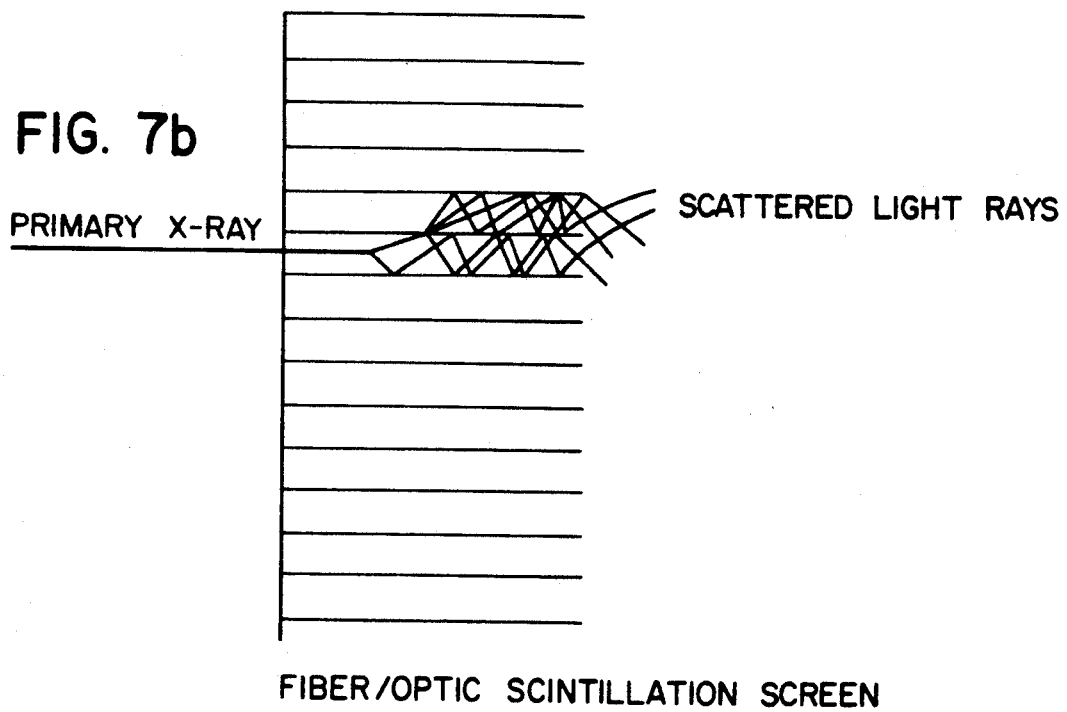

The tapered or non-tapered fiber-optic bundles 15, 19 repectively, can also be used in x-ray imaging. As shown in FIG. 6a, each of the tapered fiber-optic bundles 15 can have a phosphor screen or plate 31 attached to the top thereof in order to create an x-ray image. The phosphor screen or plate 31 conventionally comprises a scintillation screen formed of rare earth salts which absorb x-rays and emit light rays resulting in scattered light rays being emitted from the scintillating salt crystals as shown in FIG. 7a. Another embodiment for capturing an x-ray image would be the actual doping of a thin layer 32 of the fiber-optic bundle 15 with rare earth salts in order to create a fiber-optic scintillation screen as shown in FIG. 6b. FIG. 7b illustrates the improved coherency of x-ray and light scattering through the layer 32 which in effect will result in a more coherent image.

The rear end splice can be done either using an IC driver/digitizer or a scan converter. The scan converter can convert multiple video output signals from a multi-port camera or multiple single port cameras. The scan converter will now be discussed.

Referring to FIG. 8, an ultra-high-resolution multicamera device 41 is shown. The multicamera device 41 consists of a plurality of tapered fiber-optic bundles 15 which have a machined or fused joint 42 therebetween in order to form a continuous image surface. (The untapered fiber-optic bundles 19 could be used in place of the tapered fiber optic bundles 15 if desired.) A restraining clamp 43 is provided for supporting the tapered fiber-optic bundles 15 securely within an imager housing 44.

The multicamera device 41 includes solid-state cameras 45 which are connected to receive the images input to the tapered fiber-optic bundles 15 and directed to the image sensor module 17. Each sensor module 17 is relatively small compared to the largest currently available units. For example, each module may be about 590×520, enabling it to be read out at a conventional 30 frames per second rate. The tapered or non-tapered fiber-optic bundles 15,19 respectively could contain enough fibers so that the bundle sub-image 16 illuminates 512×512 sensor pixels on the image sensor module 17. The video images received by the cameras 45 are then transmitted via cable 46 to a scan converter 40 so that the video images can be spliced together to create an output which corresponds to the composite image 30.

Figure 9:
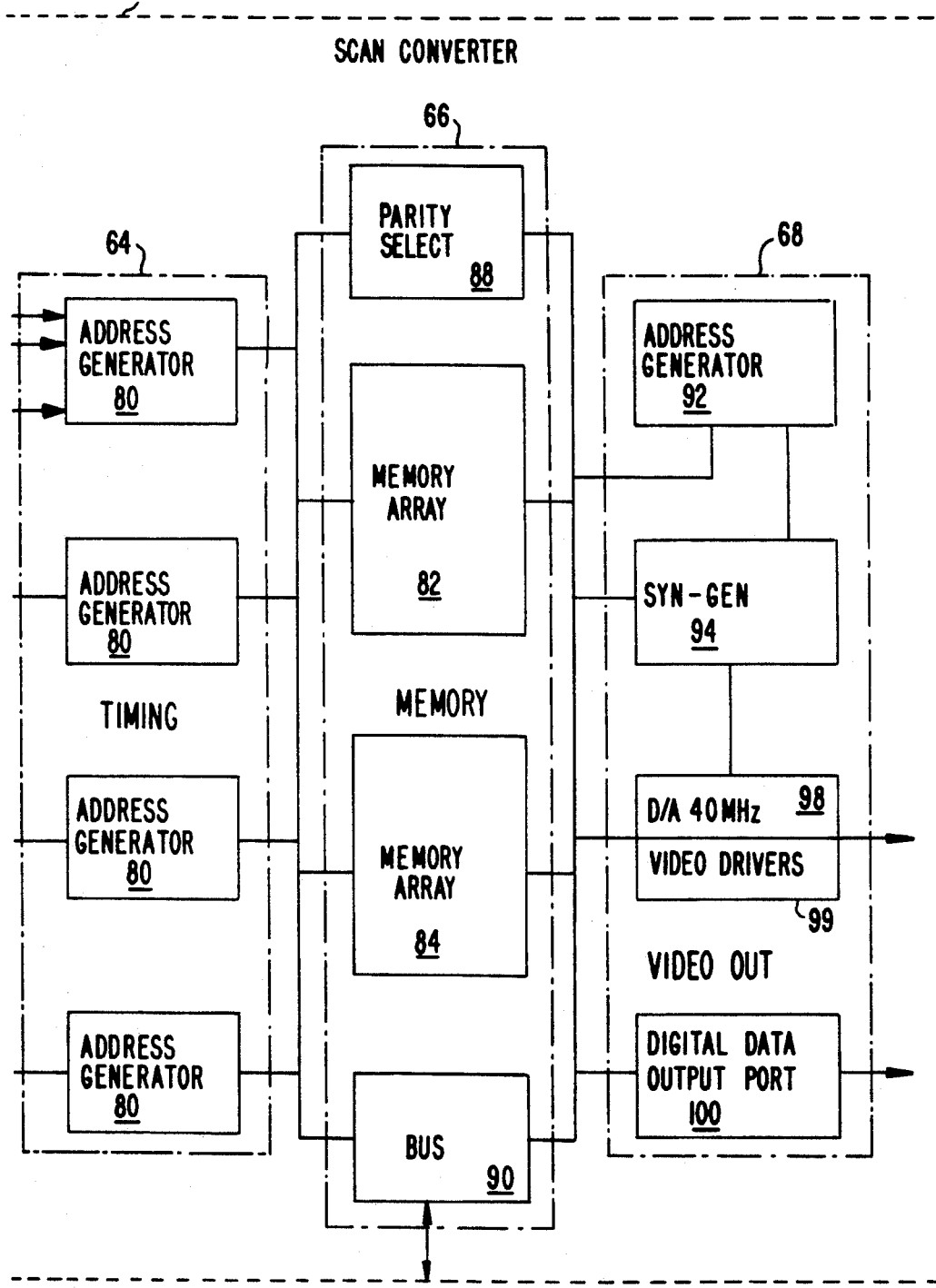
FIG. 9 illustrates a block diagram of a scan converter in accordance with the present invention.

FIG. 9 is a block diagram of the multicamera device 41 with the scan converter 40. The scan converter 40 includes an analog section 60, an A/D section 62, a timing section 64, a frame buffer section 66, and finally a video out section 68. An overview of the operation of the multicamera device 41 will now be described.

The image sensor modules 17 detect the bundle sub-images 16 and analog video signals are output via cables 46 to a buffer and clamp circuit 72 in the analog section 60. The analog video signals are synchronized to a system pixel clock 69 and clamped to a reference voltage before being output to an analog-to-digital (A/D) converter 76 in the A/D section 62, which converts the analog signals to digital video data. This digital video data is temporarily stored in a buffer 77 before being read into one of two memory arrays 82 or 84 in the memory section 66. Memory addresses are assigned to each digital video datum by address generator 80 in the timing section 64. Once digital delay generators 86 are properly adjusted the memory addresses are assigned only to digital video data of interest, i.e. the digital video data corresponding to the horizontal and vertical deadzones are not assigned memory addresses and consequently are not read into either memory array 82 or 84. After an entire frame of digital video data is stored in either memory array 82 or 84, the digital data is read out of that memory array in the proper order so that this ordered digital video data is either displayed using new global addresses and a digital display or is digital-to-analog (D/A) converted resulting in a high-resolution analog video signal. This high resolution analog video signal can be displayed as the composite image 30 (without deadzones) using a high resolution TV monitor. The multicamera device in FIG. 9 will now be described in more detail.

A video gen-lock circuit 70 synchronizes the arrival of the analog video signals from the solid-state cameras 45 with respect to each corresponding horizontal sync pulse. The synchronization of the gen-lock circuits 70 and pixel clock 69 should ensure that the video signals on line 46 are synchronized. However, if additional synchronization, a buffer circuit 73 in the buffer and clamp circuit 72 could provide a delay mechanism for delaying the analog signal so that the video lines from all four cameras arrive at the A/D converter 76, consistently to within a fraction of one system pixel cycle. The buffer circuits would provide variable delays and outputs synchronized with the pixel clock. The system pixel clock 69 could be from one of the solid-state cameras 45 or an outside clock. The gen-lock circuit 70 also provides horizontal sync pulse information to the digital delay generator 86. The digital delay generator 86 then outputs delayed horizontal and vertical sync pulses to the address generator 80, which tell the address generator 80 when to begin generating memory addresses.

The buffer and clamp circuit 72 provides video voltage regulation so that the A/D conversion of the analog video signal is on an absolute level. The portion of the video line directly following the horizontal sync pulse must be clamped at a fixed voltage level corresponding to black for example. This is necessary because the A/D converter 76 in the A/D section 62 will eventually A/D convert the video signal using this fixed voltage level as a reference level. Without the buffer and clamp circuit 72 this reference voltage level will typically vary a few millivolts from line to line and camera to camera. The buffer circuit 73 and clamp circuit 74 in the buffer and clamp circuit 72 are standard buffer and clamp circuits.

The clamped and delayed video signal output from the buffer and clamp circuit 72 as well as the synchronizing signals output by the video gen-lock circuit 70 are input to the A/D section 62. The A/D converter 76 samples the output of the buffer and clamp circuit 72, N times where N corresponds to the number of pixels in a horizontal scan of the solid-state sensor array 17; typically N is somewhere in the range of 520 to 590. The analog voltage levels V1, V2, V3 . . . , VN shown in FIG. 4d are all converted to digital signals, (typically 8 bits). In order to obtain real time high resolution images the A/D converter 76 is preferably a flash converter. The A/D conversion process is clocked at a rate corresponding to the system pixel clock 69.

The digital video data output from the A/D converter 76 is then input to a buffer 77 which holds that digital video data so that the address generator 80 can feed address lines into memory arrays 82 and 84 according to the system pixel clock 69 and/or the horizontal and vertical sync pulses. The other circuit in the A/D section 62 is the digital delay generator 86. The digital delay generator 86 is connected to the video gen-lock circuit 70 which provides the digital delay generator 86 with horizontal and vertical sync pulse information. The digital delay generator 86 has some type of discrete level setting mechanism such as a thumb wheel switch. This thumb wheel switch can be used to delay the onset by the address generator 80 of loading addresses into the memory arrays 82 or 84. This delay actually can comprise two components. There can be a delay in terms of horizontal sync pulses after a vertical sync pulse for eliminating horizontal deadzones, and there can be a delay in terms of pixel clock pulses after a horizontal sync pulse to eliminate vertical deadzones. In other words, although the A/D converter 76 is continuously digitizing the video signal, the digitized video signals output by the buffer 77 are ignored by the address generator 80 until it is commanded to begin address generation and signal storage by the digital delay generator 86. This will effectively eliminate any digital video data corresponding to the horizontal and vertical deadzones and only digital video data without deadzones is stored in the memory arrays 82 and 84. This operation is controlled by observing the composite image on the high-resolution video monitor and turning the thumbwheel switches to adjust the horizontal and vertical delays until the deadzones are eliminated.

The timing section 64 sets up and loads the digital data output from the A/D section 62 into the memory arrays 82 and 84. The address generator 80 loads the digital words into their appropriate memory location in 82 or 84. The memory arrays 82 and 84 can be standard 120 nano-second dynamic random access memory or D-RAM. This slow memory can be used only if an inter-leaving scheme is used to store the digital words output from the timing section 64. Two memory arrays 82 and 84 are used so that a complete frame can be stored in each. It is necessary to completely assemble a frame of video before it can be read out. The two memory arrays 82 and 84 make it possible to write to one memory array while reading from the other memory array and vice versa. The parity select 88 determines when to write to or read from the memory arrays 82 and 84. Hence, although twice as much memory is used, using two memory arrays eliminates tearing of the composite image. A second advantage to using two memory arrays is that the memory arrays 82 and 84 can be shared with some type of processor such as an AT computer by using a bus 90. The digital video data can then be taken out via the bus 90 and printed to a laser printer or stored on an optical disc or used in any other digital image processing device.

Figure 10A:
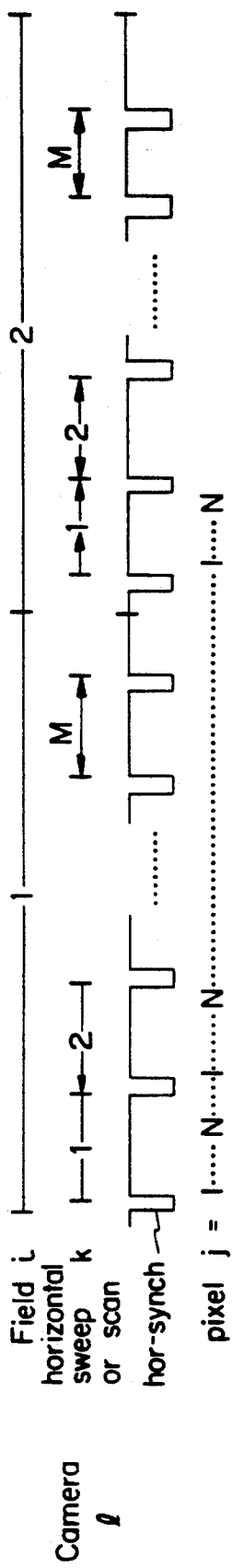
FIGS. 10a and 10b illustrate a method in which the digital video data obtained from synchronized and interlaced solid-state cameras and stored in memory arrays can be reordered to produce a composite image.
Figure 10B:
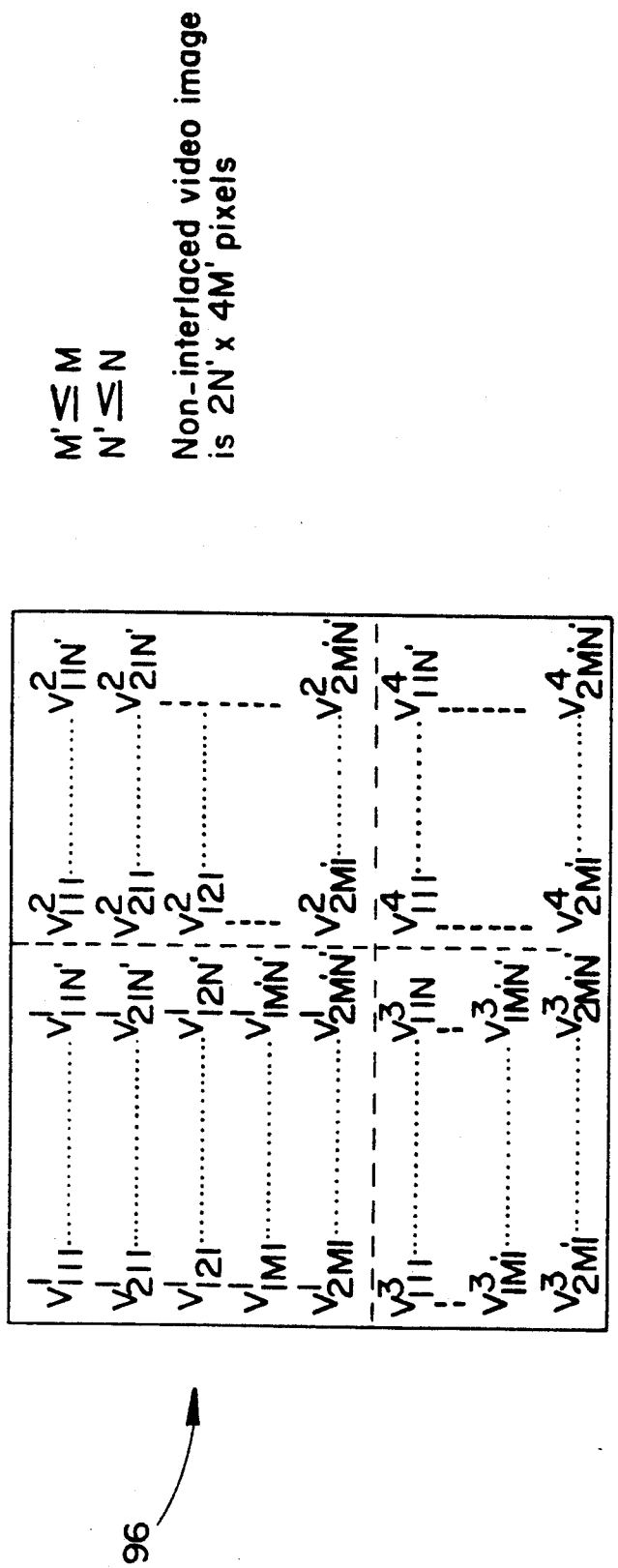

The final section of the scan converter 40 is the video out section 68. An address generator 92 provides a global address for a single frame corresponding to the composite video image 30. The address generator 92 also provides refresh to the memory arrays 82 and 84. A sync generator 94 provides an ultra-high-resolution sync signal for the single frame composite video image. It will be understood that address generator 92, sync generator 94 and D/A converter 98 are synchronized to the pixel clock of the high resolution video display, which is at least four times as fast as the pixel clock 69. FIGS. 10a and 10b demonstrate the order in which the address generator 92 would generate global addresses for outputting the digital video data stored in memory arrays 82 and 84 in order to produce the composite video image 30.

FIG. 10a shows the order in which the data is output by the A/D converter 76. The the solid-state cameras 45 all have interlaced outputs. The video signals from all four cameras have been A/D converted to digital words. Two fields, field 1 and field 2, are associated with each frame of solid-state cameras 45. The variable $v_{ijk}{}^l$ represents the digital word corresponding to the video output of camera 1, field i, horizontal sweep j, and column k, where i=1 or 2, j=1-M, k=1-N', and l=1-L, and where M is the number of horizontal sweeps output by the solid-state cameras 45 for each field. N is the number of pixel data output by each solid-state camera 45 in one horizontal sweep (typically N varies from 520 to 590). Finally, L is the number of solid-state cameras 45 (here L=4).

FIG. 10a shows that each field 1 or 2 has associated with it a series of horizontal sync pulses corresponding to a horizontal scan of camera 1, and between any two horizontal sync pulses the video signal is sampled N times as was shown in FIG. 4d. FIG. 10b then shows the order in which the address generator will generate addresses for the digital words $v_{ijk}{}^l$ in order to create a high resolution noninterlaced video image 96 which corresponds to the composite image 30 in FIGS. 4c and 5b. The sync generator 94 provides the necessary sync pulses in order to D/A convert the digital words $v_{ijk}{}^l$ from memory arrays 82 and 84 in an order corresponding to the high resolution noninterlaced video image 96 shown in FIG. 10b. Here, M' is the number of horizontal sweeps with good pixel data (no deadzones) per field (M'<M). N' is the number of good pixel data in one horizontal sweep of one frame of each of the solid-state cameras 45 (N'<N). Note that for display purposes it may be preferable that N'=2M'=512, which for the case of L=4 yields a composite image of 1024 by 1024 pixels per frame.

The analog output of the D/A converter 98 is then input to video drivers 99. The video drivers 99 output a high resolution noninterlaced video signal corresponding to the high resolution noninterlaced video image 96. In addition, a digital data output port 100 can be used to output the digital words $v_{ijk}{}^l$ in serial or parallel for input to any other peripheral device if so desired.

Figure 11:
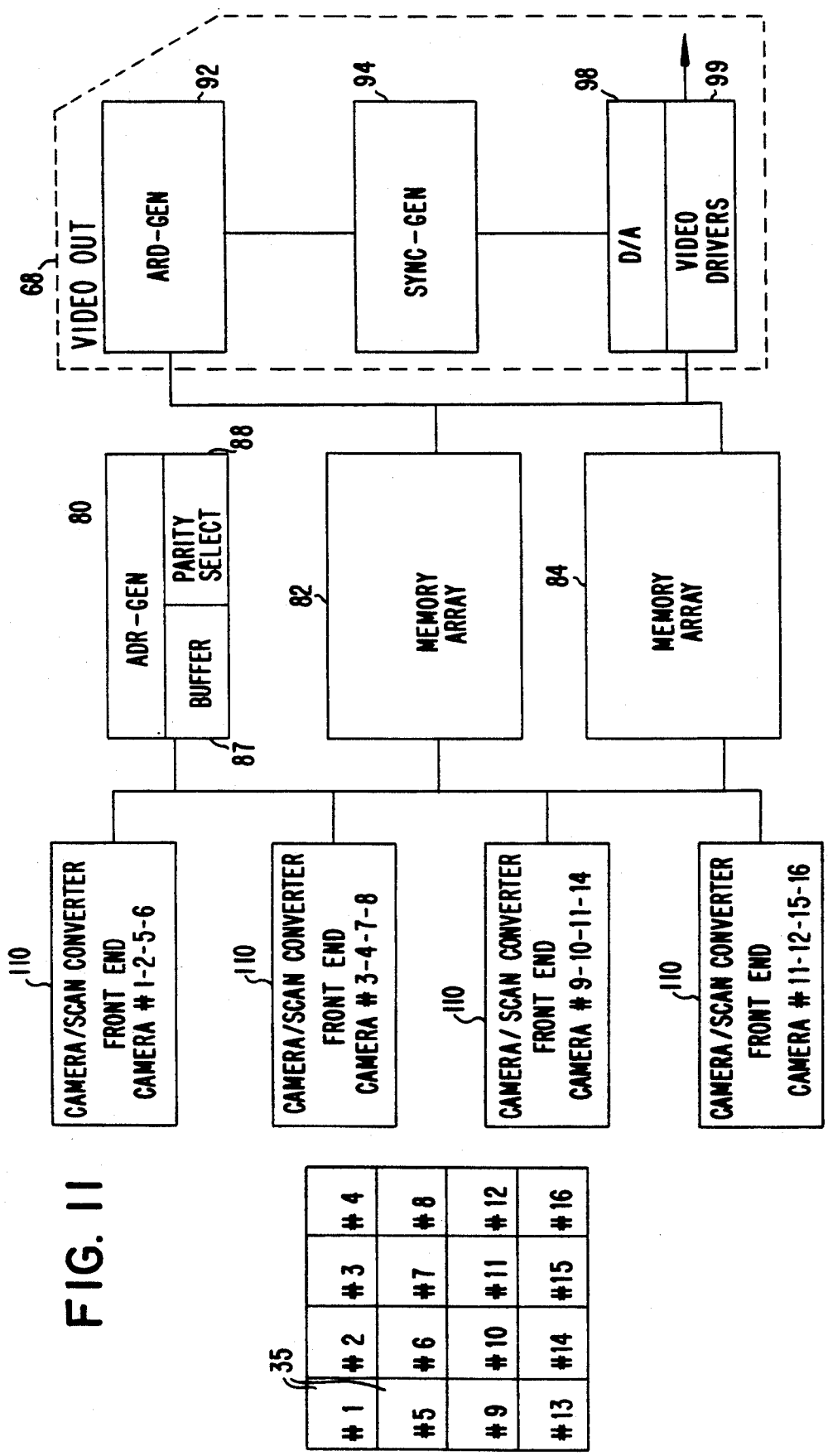
FIG. 11 illustrates how 16 solid-state cameras can be used to create an ultra-high resolution noninterlaced video signal.

FIG. 11 shows how 16 solid-state cameras 45 can be used to create an ultra-high resolution noninterlaced video signal. Here, four camera/scan converter front ends 110 correspond to the section 110 shown in FIG. 9. Since there are now 16 solid-state cameras 45 instead of four as was the case in FIG. 9, the memory arrays 82 and 84 should have four times the memory capacity. Also, in order to keep the same frame rate as in the previous embodiment, the D/A converter 98 must have a conversion rate four times as fast as the D/A converter used for the multicamera device 41 in FIGS. 8 and 9.

Figure 12:
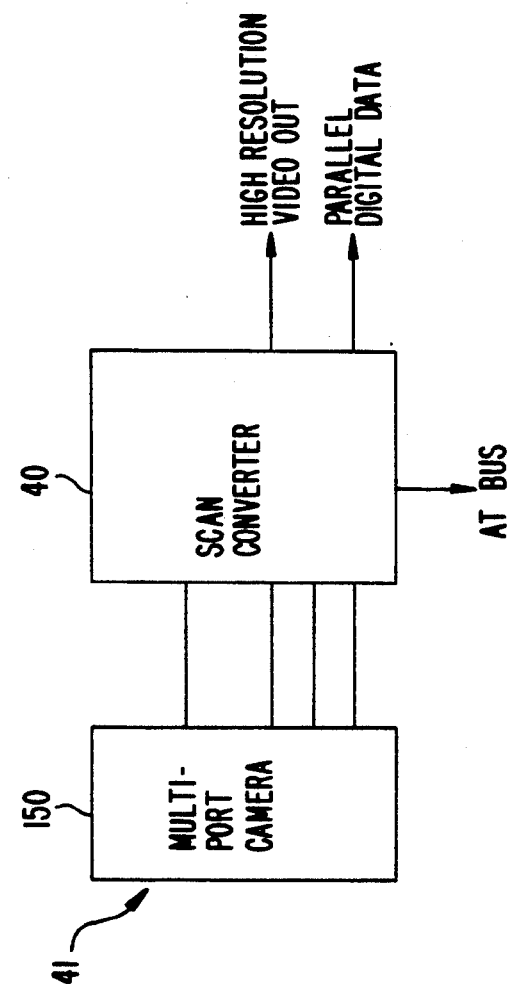
FIG. 12 is a block diagram demonstrating how the scan converter can be used with a single multiport camera.

FIG. 12 shows how a single multiport camera 150 can be used with the scan converter 40 instead of four separate solid-state cameras 45. In this case, the multiport camera 150 has four output ports. It should be noted that the multiport camera 150 can replace the four cameras in each of the camera/scan converter front ends 110 shown in FIG. 11 as well.

As was discussed earlier, the rear end splice can be achieved by either running multiple video cameras with small sensor arrays in parallel and sorting the video outputs using the scan converter 40 or by running multiple sensor driver/digitizers in parallel which either individually drive a single sensor array integrated circuit (IC) or together drive a multiport sensor array IC.

Figure 13:
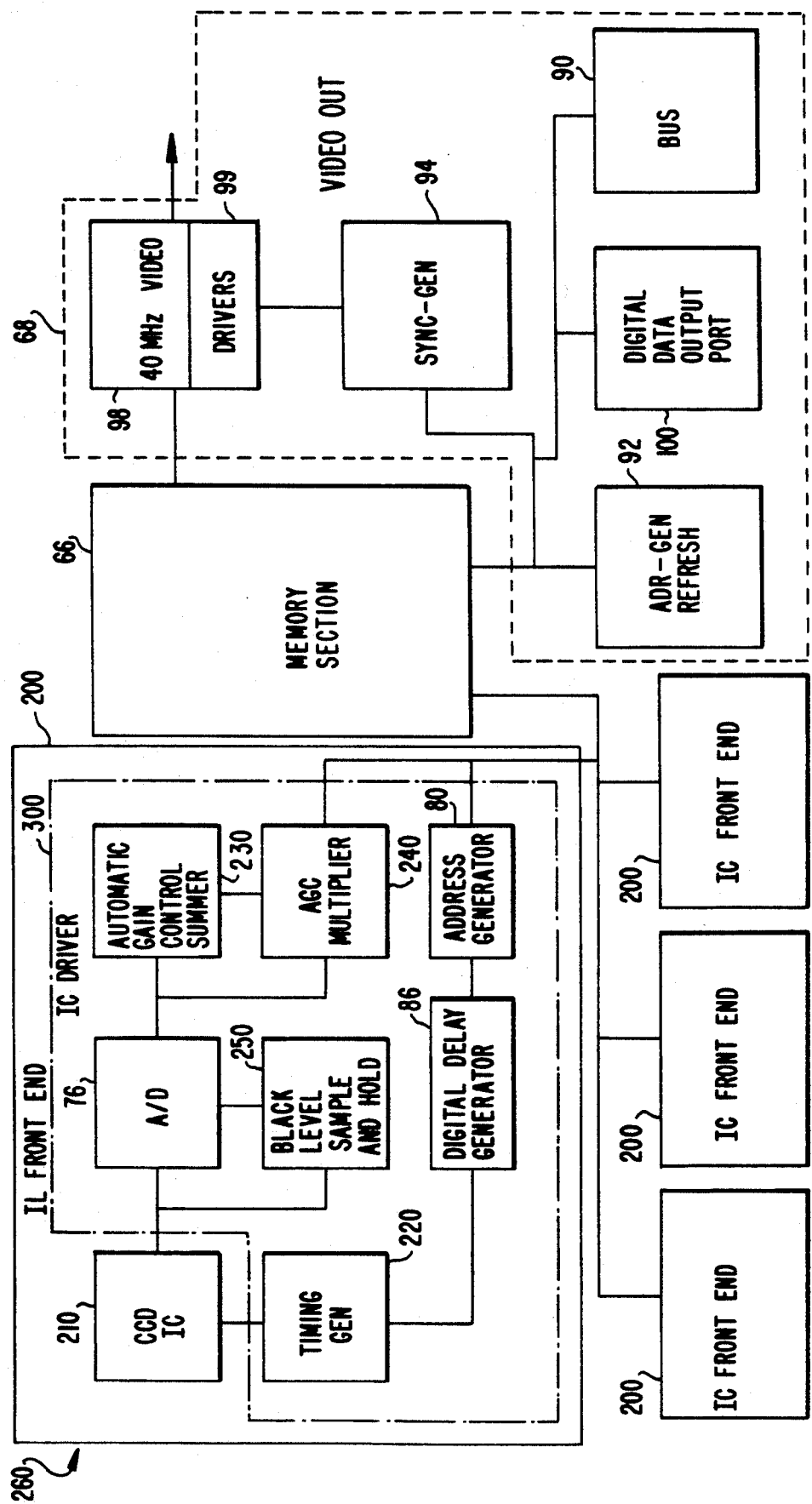
FIG. 13 is a schematic diagram of a multi IC device corresponding to the camera/scan converter front end of FIG. 9.

FIG. 13 shows an IC front end 200 corresponding to the camera/scan converter front end 110 on FIG. 11. The IC front end 200 is comprised of the IC driver 300 together with the IC 210. The apparatus on FIG. 13 is referred to here as a multi IC device 260. Here, IC 210 corresponds to the image sensor module 17 in the solid-state cameras 45 shown on FIG. 9. Hence the IC 210 can be a solid-state discrete element electro-optical scanner of the CCD, CID or MOS type preferable in integrated circuit form. The IC front end 200 differs from the camera/scan converter front end 110 in that a timing generator 220 rather than the video gen-lock circuit 70 is used to synchronize the output of the IC 210. Also, an automatic gain control (AGC) summer and multiplier 230 and 240 respectively must be added to the IC front end 200. This was not necessary for the camera/scan converter front end 110 because the solid-state cameras 45 are conventional cameras, rather than just plural sensors as in FIG. 13, and contain their own AGC control. Also, note that a black level sample and hold circuit 250 is used to provide the reference voltage to the A/D converter 76, whereas in the camera/scan converter front end 110, the buffer and clamp circuit 72 was used to provide the reference voltage. The buffer and clamp circuit 72 in the scan converter 40 was also used to precisely synchronize the video output signals from the solid-state cameras 45 to the system pixel clock 69 if necessary. Here, however the output of IC 210 is synchronized with timing generator 220 directly. The timing generator 220 also provides the IC 210 with power.

The IC 210 outputs an analog waveform which is input to the A/D converter 76. The black level sample and hold circuit 250 takes the analog signal corresponding to black and samples and holds this voltage level. This voltage level is provided to the A/D converter 76 by the black level sample and hold circuit 250 in order to provide the A/D converter 76 with a reference voltage with which to compare the analog signal output from the IC 210 during digitization. The digital delay generator 86 is connected to the address generator 80 and the timing generator 220. The timing generators 220 are all sycnchronized with respect to each other. The timing generators could in fact originate from a single timing generator circuit. The timing generator 220 plays a role analagous to the system pixel clock 69 in FIG. 9. The digital delay generator 86 is used to delay the onset of address generation by the address generator 80. The digital delay generator does this by delaying the timing signals output by the address generator 220 before inputting these timing signals to the address generator 80, which in turn generates memory addresses in response to these delayed timing signals. The amount of delay can be dialed in as discussed previously so that the composite video image 30 no longer has horizontal or vertical deadzones. The memory addresses output by the address generator 80 are again used to store the digital data output from the AGC multiplier 240 in the frame buffer section 66 which is identical to the frame buffer section 66 in the scan converter 40 shown in FIG. 9.

The solid-state cameras 45 for the multicamera device 41 all had AGC control so that the output voltage was normalized with respect to the light level. The AGC summer 230 and the AGC multiplier 240 provide this function in the following manner. The AGC summer 230 sums the output from an entire video frame like a counter and then divides this total by the total number of pixels in the frame in order to obtain an average pixel value for that frame. This average pixel value is then input to the AGC multiplier 240 which takes the output of the A/D converter 76 and normalizes this output. This normalized output is then sent to the memory section 66 using the address generator 80. Finally, the IC front end 200 without the IC 210 is referred to as an IC driver 300 as shown in FIG. 13. This IC driver 300 can be used to drive a multiport IC sensor 310 as shown in FIG. 14. The memory section 66 and the video out section 68 are identical to those of FIG. 13. Hence, the only difference between the multi IC device 260 of FIG. 13 and that of FIG. 14 is that the IC 210 are all on the single multiport IC sensor 310.

One drawback of using a large number of fiber-optic bundles is that the final video image could contain more pixel data than conventional video equipment can readily display. For this reason, the use of a moving fovea will assist in displaying this data.

FIG. 15 shows an example of a fovea imaging system 400. Here, optical fiber bundles 471 can either be tapered of nontapered. The tips of the optical fiber bundles 471 can be doped with rare earth salts or be situated behind a phosphorous screen so that the fovea imaging system 400 is sensitive to x-ray radiation. The camera system 472 can be the multi-camera device 41 as shown in FIGS. 9 and 13 or the multi-IC device 260 as shown in FIGS. 14 and 15.

Moving fovea circuit 473 receives the data from the camera system 472 and processes same such that a user may display the particular pixel data desired. For instance, should the user desire to display the entire composite image 30, the moving fovea circuit would select a sampling of the pixel data due to the fact that all of the pixel data could not be displayed. So, for example, one of every four pixels could be output to a video output 474 in order to realize a truncated version of an entire composite image. Should the user desire high-resolution output of particular segments of the composite image, the moving fovea circuit 473 would operate to provide only those sectors of video pixel data selected by the user through joystick/controller 475. By selecting certain segments of the entire composite video image which are smaller than the entire composite image, it is now possible to output all of the pixel data associated with the segments selected.

We claim:
1. An apparatus comprising:
a plurality of optic fibers;
a plurality of video sensors connected respectively to said optic fibers, each of which sensors senses a corresponding non overlapping portion of an overall image and each of which outputs a video signal representing a plurality of pixels for its corresponding portion of the image;
means for aligning said video sensors with said optic fibers to produce dead zones in said video signals;
means for receiving said video signals;
means for eliminating said deadzones from said video signals; and means for concatenating said plurality of pixels from said video signals in a manner to reproduce said overall image in a single picture signal output.

2. An apparatus as claimed in claim 1 wherein said video signals are synchronized with respect to a system pixel clock.

3. An apparatus as claimed in claim 1 wherein said video signals are a plurality of analog video signals.

4. An apparatus as claimed in claim 3 further comprising a plurality of analog-to-digital converting means for converting said plurality of analog video signals to digital video data.

5. An apparatus as claimed in claim 4 wherein said means for concatenating comprises a memory means for storing said digital video data.

6. An apparatus as claimed in claim 5 wherein said means for concatenating further comprises a plurality of address generator means for generating memory addresses for said digital video data.

7. An apparatus as claimed in claim 6 further comprising a plurality of delay means for delaying onset of memory address generation by a plurality of delay times.

8. An apparatus as claimed in claim 6 wherein said memory means comprises:
first and second memory buffer means for storing said digital video data according to said memory addresses;
parity select means for controlling the storing of said digital video data into said first and second memory buffer means.

9. An apparatus as claimed in claim 5 wherein said means for concatenating comprises means for outputting said digital video data from said memory.

10. An apparatus as claimed in claim 9 wherein said means for outputting comprises means for reading said digital video data from said memory means in a predetermined order.

11. An apparatus as claimed in claim 10 wherein said means for reading comprises:
synch-generator means for generating video timing signals;
global address generator means responsive to said video timing signals for reading said digital video data in a predetermined order and for generating global addresses for said digital video data.

12. An apparatus as claimed in claim 11 further comprising digital-to-analog converter means responsive to said video timing signals for converting said digital video data into a high resolution analog video signal.

13. An apparatus as claimed in claim 12 further comprising video driver means for driving a display means responsive to said high resolution analog video signal.

14. An apparatus as claimed in claim 1 including a phosphor in said optic fibers for sensing x-radiation.

15. An apparatus as claimed in claim 4 further comprising a clamping means for clamping a plurality of reference voltages, said plurality of reference voltages being used as references for said plurality of analog-to-digital converting means.

16. An apparatus as claimed in claim 7 wherein said plurality of delay times are comprised of a plurality of horizontal and vertical delay times.

17. An apparatus as claimed in claim 1 wherein each said sensor is part of a different single port camera.

18. An apparatus as claimed in claim 1 wherein said sensors comprise a multiport camera.

19. An apparatus as claimed in claim 7 wherein said plurality of delay means comprise user settings wherein varying user settings results in corresponding variations in said plurality of delay times.

20. An apparatus comprising:
timing signal generating means for generating a timing signal;
sensor array mans comprising a plurality of discrete sensor elements responsive to said timing signal for sensing a radiation field and outputting a plurality of sensor signals corresponding to respective portions of said radiation field;
means for converting said plurality of sensor signals to corresponding video data signals;
means for selecting all or part of each of said video data signals as selected data signals;
memory buffer means for storing said selected video data signals as stored video data;
means for sequentially outputting said stored video data signals as an image from said memory buffer means;
at least one bundle of optical fibers, said bundle of optical fibers receiving input radiation at one end and directing said input radiation to said sensor array means; and
wherein said bundle of optical fibers is not tapered.

21. An apparatus comprising:
timing signal generating means for generating a timing signal;
sensor array means comprising a plurality of discrete sensor elements responsive to said timing signal for sensing a radiation field and outputting a plurality of sensor signals corresponding to respective portions of said radiation field;
means for converting said plurality of sensor signals to corresponding video data signals;
means for selecting all or part of each of said video data signals as selected data signals:
memory buffer means for storing said selected video data signals as stored video data;
means for sequentially outputting said stored video data signals as an image from said memory buffer means;
at least one bundle of optical fibers, said bundle of optical fibers receiving input radiation at one end and directing said input radiation to said sensor array means; and
x-ray converting means for converting input x-ray radiation into said input radiation.

22. An apparatus as claimed in claim 21, wherein said x-ray converting means is an x-ray sensitive screen.

23. An apparatus as claimed in claim 22, wherein said x-ray sensitive screen is a phosphor screen.

24. An apparatus as claimed in claim 21 wherein said sensor array is at least one multi-port solid-state sensor array.

25. An apparatus as claimed in claim 21 further comprising a moving fovea circuit which enables a user to output only selected segments of said video data to a video display unit.

26. An apparatus comprising:
timing signal generating means for generating a timing signal;
sensor array means comprising a plurality of discrete sensor elements responsive to said timing signal for sensing a radiation field and outputting a plurality of sensor signals corresponding to respective portions of said radiation field;

means for converting said plurality of sensor signals to corresponding video data signals;

means for selecting all or part of each of said video data signals as selected data signals;

memory buffer means for storing said selected video data signals as stored video data;

means for sequentially outputting said stored video data signals as an image from said memory buffer means; and at least one bundle of doped optical fibers, said bundle of doped optical fibers comprises a doped portion and an undoped portion, said doped portion being doped with an x-ray sensitive material wherein a first radiation is input to said doped portion and absorbed by said x-ray sensitive material, said x-ray sensitive material outputs a second radiation, and said undoped portion directs said second radiation to said sensor array means.

27. An apparatus as claimed in claim 26 wherein said x-ray sensitive material is comprised of rare earth salts.

28. An apparatus as claimed in claim 26 further comprising a receiving means for receiving outside x-ray radiation and for outputting said outside x-ray radiation as said first radiation.

29. An apparatus as claimed in claim 26 wherein said sensor array means is a plurality of single port solid-state sensor arrays.

30. An apparatus as claimed in claim 29 wherein said plurality of single port solid-state sensor arrays are CCD arrays.

31. An apparatus as claimed in claim 29 wherein said plurality of single port solid-state sensor arrays are MOS arrays.

32. An apparatus as claimed in claim 27 wherein said sensor array means at least one multi-port solid-state sensor array.

33. An apparatus as claimed in claim 32 wherein said multiport solid-state sensor arrays are multiport CCD arrays.

34. An apparatus as claimed in claim 32 wherein said multiport solid-state sensor arrays are multiport MOS arrays.

35. An apparatus as claimed in claim 26 further comprising a moving fovea circuit which enables a user to output only selected segments of said video data to a video display unit.

36. An apparatus comprising:

timing signal generating means for generating a timing signal;

sensor array means comprising a plurality of discrete sensor elements responsive to said timing signal for sensing a radiation field and outputting a plurality of sensor signals corresponding to respective portions of said radiation field;

means for converting said plurality of sensor signals to corresponding video data signals;

means for selecting all or part of each of said video data signals as selected data signals;

memory buffer means for storing said selected video data signals as stored video data;

means for sequentially outputting said stored video data signals as an image from said memory buffer means; and a moving fovea circuit which enables a user to output only selected segments of said video data to a video display unit.

37. An apparatus comprising:

timing signal generating means for generating a timing signal;

sensor array means comprising a plurality of discrete sensor elements responsive to said timing signal for sensing a radiation field and outputting a plurality of sensor signals corresponding to respective portions of said radiation field;

means for converting said plurality of sensor signals to corresponding video data signals;

means for selecting all or part of each of said video data signals as selected data signals;

memory buffer means for storing said selected video data signals as stored video data;

means for sequentially outputting said stored video data signals as an image from said memory buffer means;

at least one bundle of optical fibers, said bundle of optical fibers receiving input radiation at one end and directing said input radiation to said sensor array means; and a moving fovea circuit which enables a user to output only selected segments of said video data to a video display unit.

38. A method comprising the steps of:

sensing an overall image using a plurality of optic fibers coupled to a plurality of video sensors, each of which sensors senses a corresponding non overlapping portion of said overall image and outputs a video signal representing a plurality of pixels for its corresponding portion of the image;

aligning said video sensors with said optical fibers to produce dead zones in said video signals;

receiving said video signals;

eliminating said dead zones from said video signals;

concatenating said plurality of pixels from said video signals in a manner to reproduce said overall image in a single picture signal output.

* * * * *